G. W. FURMAN.
METHOD OF RELEIVING STEAM CYLINDERS OF CONDENSED STEAM.
No. 31,116. Patented Jan. 15, 1861.
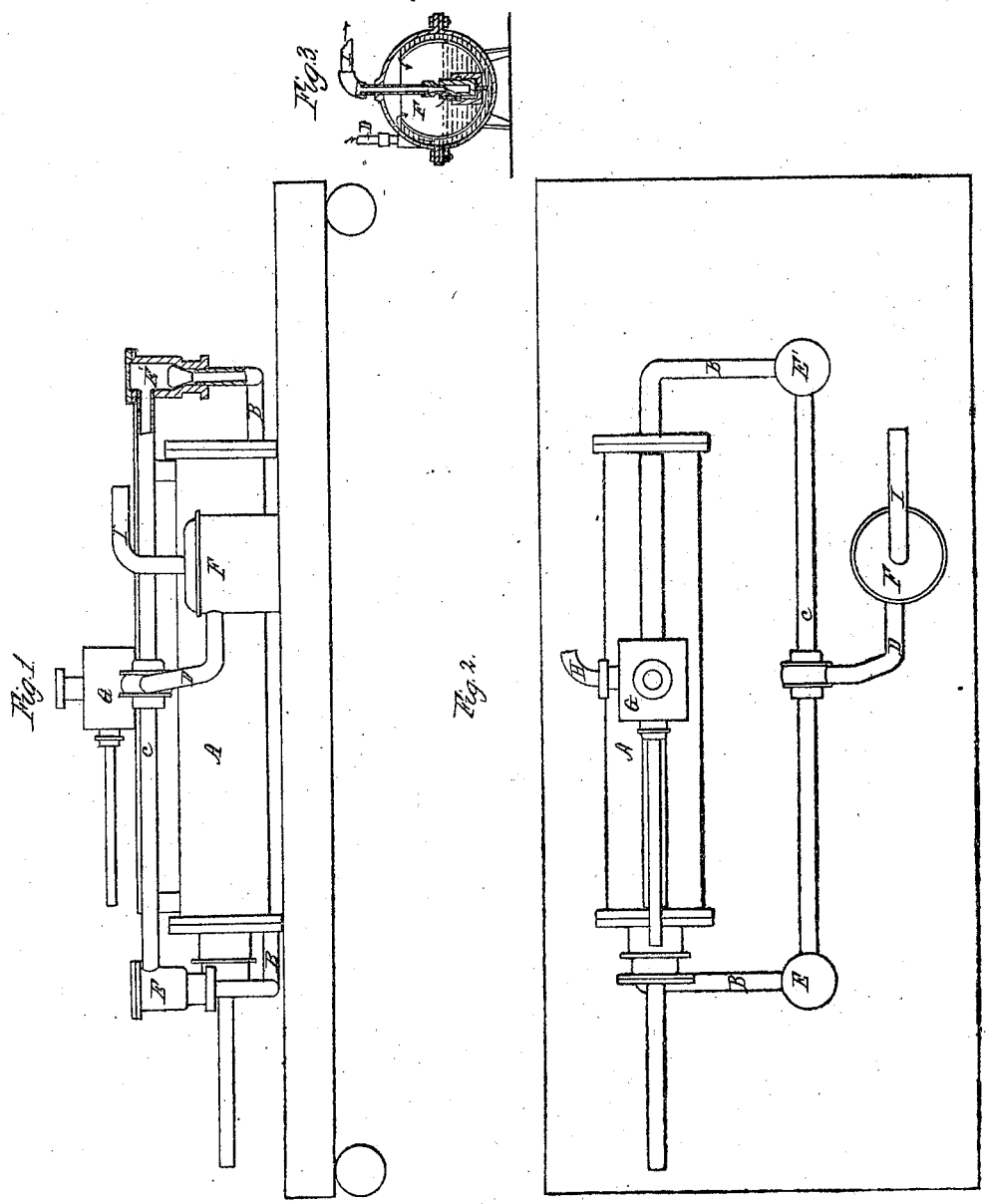
Witnesses.
C. A. Gordon
J. A. Megay
Inventor.
Geo. W. Furman by his Atty
Ashbury Dorass

UNITED STATES PATENT OFFICE.

GEORGE W. FURMAN, OF BROOKLYN, NEW YORK.

MODE OF RELIEVING STEAM-CYLINDERS OF WATER OF CONDENSATION.

Specification of Letters Patent No. 31,116, dated January 15, 1861.

*To all whom it may concern:*

Be it known that I, GEORGE W. FURMAN, of Brooklyn, Kings county, and State of New York, have invented, made, and applied to use a new and Improved Mode of Relieving Steam-Cylinders of Condensed Steam; and I do declare the following to be a full, clear, and exact description thereof, reference being had to the accompanying drawings, and to the letters of reference marked thereon, in which—

Figure I is a front edge view of my improved mode of relieving steam cylinders of condensed steam. Fig. II a sectional view of the same. Fig. III a cut sectional view of the steam trap used.

In the drawings, like parts of the invention are indicated by the same letters of reference.

The nature of my invention consists in an improved method of relieving steam cylinders of condensed steam by the employment of the means hereinafter set forth.

To enable those skilled in the arts to make and use my invention I will proceed to describe its construction and operation.

A shows a steam-cylinder and B, B are pipes connecting the cylinder A with check-valves E and E' placed at either end of the cylinder A and connected together by communication pipe C.

D shows a pipe connecting pipe C with a steam trap F.

G shows the steam chest and H an exhaust pipe.

I shows an exit pipe attached to steam trap F, through which the water of condensation is driven off.

Operation: As steam condenses into water in the cylinder A, the water of condensation as it is termed with a certain quantity of steam passes from the cylinder A by means of pipes B, and D into the trap F. As the water of condensation and steam pass from the cylinder A to trap F, the valve E is opened and the steam entering communication pipe C, bears against the valve E', and keeps the same closed; thus preventing the return of any steam from the trap F to cylinder A and using the steam thus retained in trap F to drive off the water from trap F through the exit pipe T.

My improvement is particularly applicable to locomotive engines, in the case of which, the cylinders are readily relieved of condensed steam and the water of condensation is passed through the pipes and trap to the water tank or tender by which means the engines are relieved of the back pressure of water and the water now thrown with the exhaust steam into the smoke-funnel is used to heat the water in the tank which supplies the boiler. By the use of my invention also, one or any number of cylinders may be relieved of the water of condensation and only one trap may be employed for this purpose, which may be connected with the cylinders in each case by means of the pipes and valves as shown and described herein.

Having thus described my invention what I claim as new and desire to secure by Letters Patent is.

The combination of the steam cylinder A with the pipes B, B, C and D, valves E and E' and steam trap F, when the same shall be combined and operated as described and for the purpose set forth.

G. W. FURMAN.

In presence of—
A. SIDNEY DOANE,
C. O. GORDON.